United States Patent [19]
Sato et al.

[11] Patent Number: 5,415,535
[45] Date of Patent: May 16, 1995

[54] SEMICONDUCTOR RESIN SEALING APPARATUS

[75] Inventors: Takao Sato, Tokyo; Hidenobu Sato, Kawasaki, both of Japan

[73] Assignee: Kabushiki Kaisha Toshiba, Kawasaki, Japan

[21] Appl. No.: 177,957

[22] Filed: Jan. 6, 1994

[30] Foreign Application Priority Data

Feb. 12, 1993 [JP] Japan .................. 5-024016
Sep. 28, 1993 [JP] Japan .................. 5-241234

[51] Int. Cl.6 ............... B29C 45/73; B29C 45/78
[52] U.S. Cl. .................. 425/116; 425/143; 425/144; 425/547; 425/DIG. 13; 264/272.17; 249/78; 219/449
[58] Field of Search ............... 219/392, 407, 424, 441, 219/449, 552; 425/116, 552, DIG. 13, 547, 544, DIG. 228, 143, 144; 264/272.17; 249/78

[56] References Cited

U.S. PATENT DOCUMENTS

| | | | |
|---|---|---|---|
| 3,370,120 | 2/1968 | Lasch | 219/424 |
| 4,208,574 | 6/1980 | Schafer | 249/78 |
| 4,586,690 | 5/1986 | Hartel et al. | 249/78 |
| 4,609,343 | 9/1986 | Tejfalussy | 432/36 |
| 4,659,304 | 4/1987 | Day | 425/DIG. 13 |
| 4,711,989 | 12/1987 | Yu | 219/390 |
| 4,856,979 | 8/1989 | Schreck | 425/DIG. 13 |
| 5,108,278 | 4/1992 | Tsutsumi et al. | 425/116 |
| 5,158,132 | 10/1992 | Guillemot | 425/DIG. 13 |
| 5,258,601 | 11/1993 | Takano | 219/486 |

FOREIGN PATENT DOCUMENTS

| | | | |
|---|---|---|---|
| 61-249721 | 11/1986 | Japan | 249/78 |
| 62-207615 | 9/1987 | Japan | 249/78 |
| 2233275 | 1/1991 | United Kingdom | 249/78 |

*Primary Examiner*—Khanh Nguyen
*Attorney, Agent, or Firm*—Finnegan, Henderson, Farabow, Garrett & Dunner

[57] ABSTRACT

A chase is arranged on a heating plate of a die set. Semiconductor packages are arranged, as products to be heated, in cavities of the chase. A runner is provided in the surface of the chase to feed a molten resin into the cavities. The heating plate has a hole for a rod-like heater and a hole for a temperature monitoring sensor. The rod-like heater is inserted into the heater insertion hole and the sensor is inserted into the sensor insertion hole. The heater has a plurality of mutually independent heat generation areas in its axial direction. The sensor detects temperature at the heat generation areas of the heater. A control section monitors the temperature near the respective heat generation areas of the rod-like heater and sets the temperature at the respective heat generation areas of the rod-like heater to a predetermined level.

4 Claims, 6 Drawing Sheets

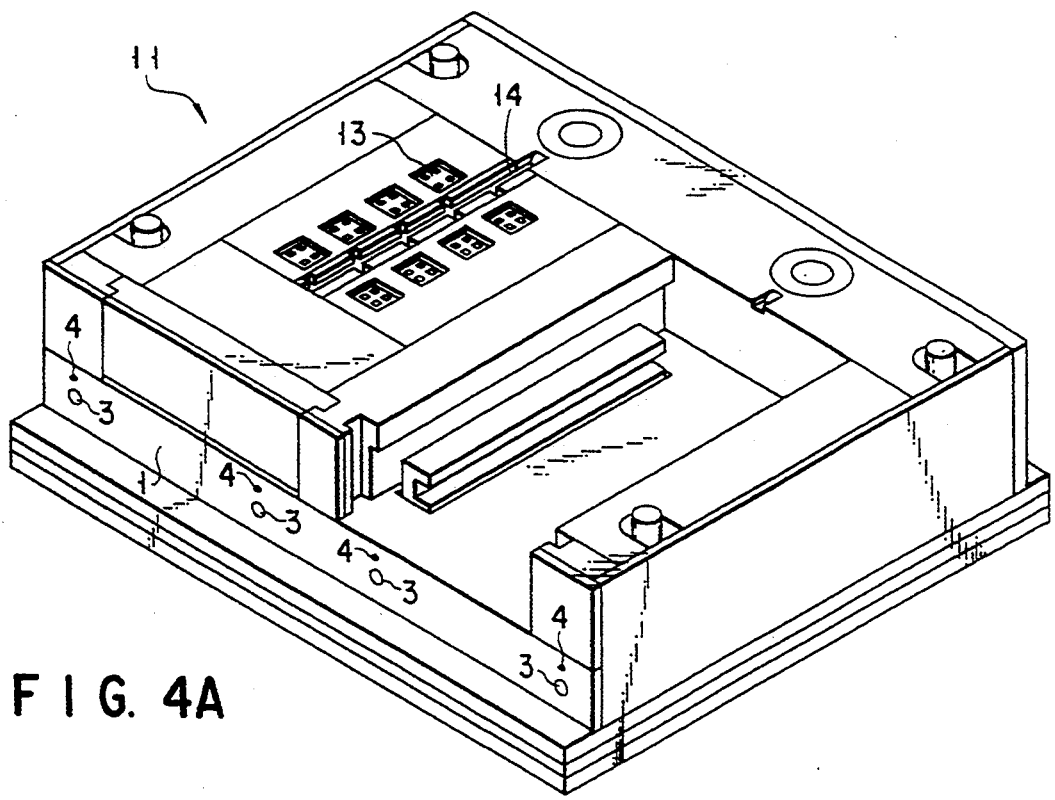
F I G. 4A
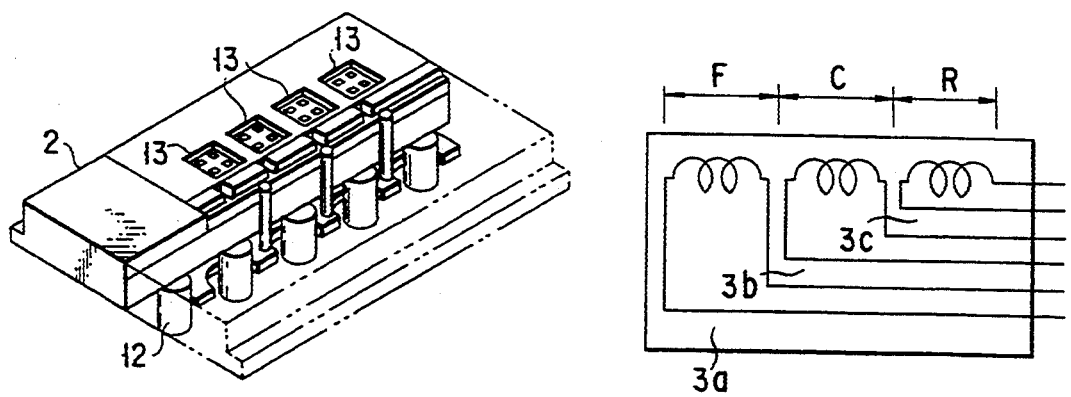
F I G. 4B
F I G. 5B
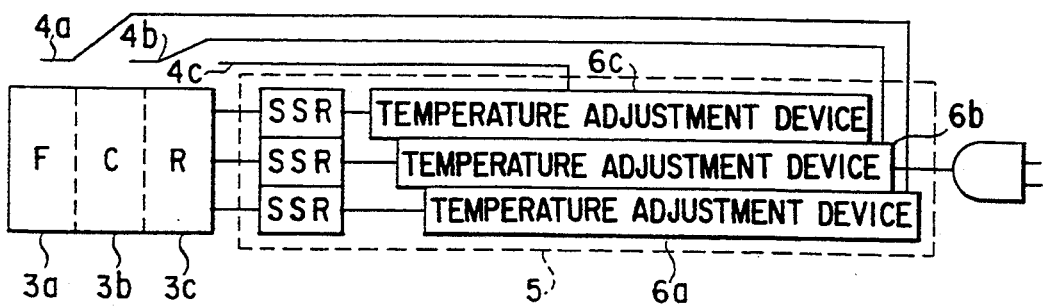
F I G. 5A

SEMICONDUCTOR RESIN SEALING APPARATUS

BACKGROUND OF THE INVENTION

1. Field of the Invention

The present invention relates to an improvement in a transfer mold for semiconductor resin sealing.

2. Description of the Related Art

Conventionally, the transfer mold for semiconductor resin sealing has a plurality of rod-like heaters 7, for example, as shown in FIG. 1. In general, the mold temperature is monitored by one or a plurality of sensors 8 and the heater 7 and sensor 8 are controlled by a control section 9.

Since the rod-like heater 7 has a given heat generation distribution, it is necessary to initially select the characteristic of the heater upon manufacture. If, therefore, the heat generation distribution of the heater is varied, the heater by itself has to be replaced by a new one having a characteristic near that distribution.

For the conventional rod-like heater it is necessary to initially select the heater characteristic upon manufacture and the temperature distribution on the surface of the heating plate is determined by the characteristics such as the quantity of heat. Further, even when the characteristic of the heater is so determined as to obtain desired heat generation distribution, this determination is made after repeated trial-and-error actions. This incurs a longer trial period of time and added costs.

As shown, for example, in FIGS. 2 and 3, when a heater 7a (FIG. 2) is selected so as to obtain uniform temperature distribution on the heating plate, the temperature distribution of the heating plate is made uniform. In order to obtain the uniform temperature distribution of the heating plate, it is necessary to replace the heater 7a (FIG. 2) with a heater 7b (FIG. 3).

The temperature distribution of the heating plate can be freely set in one direction by varying the set temperature of respective heaters in a direction in which these heaters are arranged as a pitch array. However, the temperature distribution of the heating plate cannot be freely set in another direction because it is determined by the heat generation characteristic of these heaters in an axial direction of the respective heater, that is, in a direction in which the heater is inserted.

For the semiconductor resin sealing mold arranged on the heating plate with to-be-heated products placed therein, it is difficult to set temperature at any given area on the heating plate due to variation in quantity of heat on the heating plate. In order to compensate for some lack in the quantity of heat by and reach necessary heat generation distribution, an external heater, etc., and an extra space, etc., are necessary.

It is thus necessary to initially select the characteristic of the heater upon manufacture. The temperature distribution is determined by the heat generation characteristic of the heater in the insertion direction of the heater and cannot be freely varied when there occurs a variation in the quantity of heat, etc.

SUMMARY OF THE INVENTION

It is accordingly the object of the present invention to provide a semiconductor resin sealing apparatus which can achieve a given heat generation distribution in an axial direction of a heater, that is, in a direction in which the heater is inserted, and can freely control temperature at those areas where to-be-heated products are placed.

In order to achieve the object of the present invention the semiconductor resin sealing apparatus of the present invention includes a die set, a chase, a rod-like heater, a sensor and a control section. The die set has a heating plate which has a heater insertion hole and a sensor insertion hole near the heater insertion hole. The chase is mounted on the heating plate. The chase has, at its surface, cavities with semiconductor devices placed therein and a runner serving as a passage for mold resin. The rod-like heater is inserted into the heater insertion hole and has a plurality of heat generation areas from a front end toward a rear end. The sensor is inserted into the sensor insertion hole to detect temperature at the respective heat generation areas of the rod-like heater. Based on temperature at these heat generation areas of the rod-like heater detected by the sensor the control section independently sets the temperature at the respective heat generation areas of the heater to a given level.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 4A is a view generally showing a semiconductor resin sealing apparatus according to the present invention;

FIG. 4B is a view generally showing a chase of a semiconductor resin sealing apparatus according to the present invention;

FIG. 5A is a view showing, in detail, a heater, sensor and control section of the present invention;

FIG. 5B is a view showing, in detail, a heater, sensor and control section of the present invention;

DETAILED DESCRIPTION OF THE PREFERRED EMBODIMENTS

Figure 1:
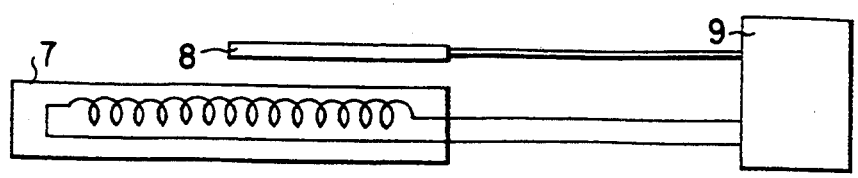
FIG. 1 is a view showing a conventional heater, sensor and control section.
Figure 2:
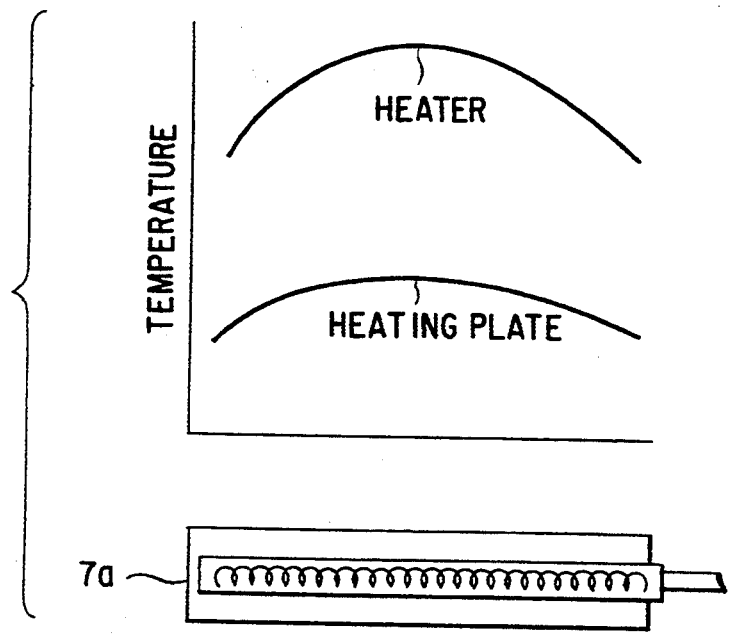
FIG. 2 shows a relation of a heater temperature to a heating plate in a heater arrangement of a conventional mold.
Figure 3:
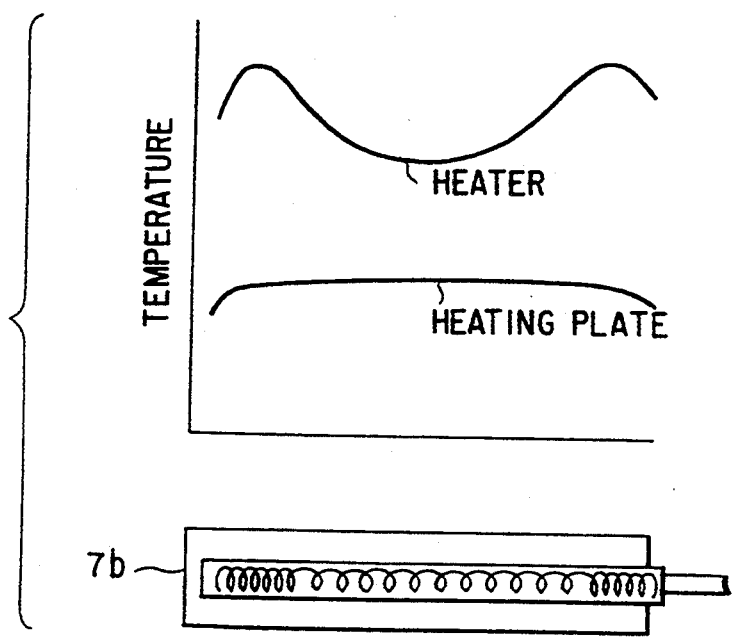
FIG. 3 shows a relation of a heater temperature to a heating plate in a heater arrangement of a conventional mold.

One embodiment of the present invention will be explained below in more detail by referring to the accompanying drawings.

FIGS. 4A and 4B show a semiconductor resin sealing transfer mold according to one embodiment of the present invention.

The semiconductor resin sealing transfer mold comprises a die set 11 and a chase 2. The chase 2 is located on a heating plate (main base) 1 of the die set 11. A semiconductor package, not shown, to be heated is placed in cavities 13 in the chase 2. A runner 14 is provided in the surface of the chase 2 to feed a molten resin into the cavity 13.

Holes 3, 4 are provided in the heating plate 1 to allow a rod-like heater and temperature monitoring sensor to be inserted therein. Four holes 3 are provided as the heater insertion holes in the heating plate 1 at predetermined intervals. Further, four holes 4 are provided as the sensor insertion holes so as to correspond to the heater insertion holes. One rod-like heater is inserted into the heater insertion hole 3 and the sensor is inserted into the sensor insertion hole 4. The present invention can achieve its object even if the number of the holes 3 and holes 4 is two or more, respectively, though the number of the holes 3 and holes 4 has been explained as being four each.

When a different kind of semiconductor packages is used as products to be heated, a corresponding chase is employed for exchange. Support pins 12 in the chase 2 bear loads during the pressing time of the transfer mold and are located at predetermined places, taking into consideration the size of the semiconductor package, the length of a frame, etc.

Heat upon transfer molding is transferred to the runner 14 and cavities 13 through the support pins 12. Therefore, the temperature distribution of the chase 2 differs depending upon what type of semiconductor packages is manufactured.

FIGS. 5A and 5B show a detail of one rod-like heater and its control section.

The rod-like heater has a plurality of heat generation areas, for example, three heat generation areas (a front end portion F, a middle portion C and a rear end portion R) from the front end toward the rear end. The heat generation area of the front end portion F is comprised of a heat element $3a$, such as a filament. The heat generation area of the middle portion C is composed of a heat generation element $3b$. The heat generation area of the rear end portion R is comprised of a heat generation element $3c$.

Temperature monitoring sensors $4a$, $4b$, and $4c$ are provided near the heat generation areas F, C and R, respectively, of the rod-like heater to detect temperature prevailing in the respective heat generation areas.

The temperature monitoring sensors $4a$, $4b$, $4c$ are each inserted into the corresponding hole (see FIG. 4A) 4 for heater insertion.

The heat generation elements $3a$, $3b$, $3c$ and temperature monitoring sensors $4a$, $4b$, $4c$ are connected to a control section 5. Temperature adjusting devices $6a$, $6b$, $6c$ adjust quantities of heat from the heat generation elements $3a$, $3b$, $3c$ on the basis of the temperature levels of the heat generation areas F, C and R detected by the sensors $4a$, $4b$, $4c$.

One heater has three heat generation areas, F, C and R along a direction in which it is inserted into the heating plate, that is, in an axial direction of the heater. The respective heat generation elements $3a$, $3b$, $3c$ are independently connected to the corresponding temperature adjusting devices $6a$, $6b$, $6c$. Thus the control section 5 can independently control the quantities of heat generated from the heat generation elements $3a$, $3b$, $3c$. The sensors $4a$, $4b$, $4c$ are connected to the temperature adjusting devices $6a$, $6b$, $6c$ and monitor the temperature levels near the heat generation areas F, C and R. The temperature adjusting devices $6a$, $6b$, $6c$ adjust the quantities of heat from the heat generation elements $3a$, $3b$, $3c$ on the basis of the temperature levels detected at the heat generation areas F, C and R.

Figure 5C:
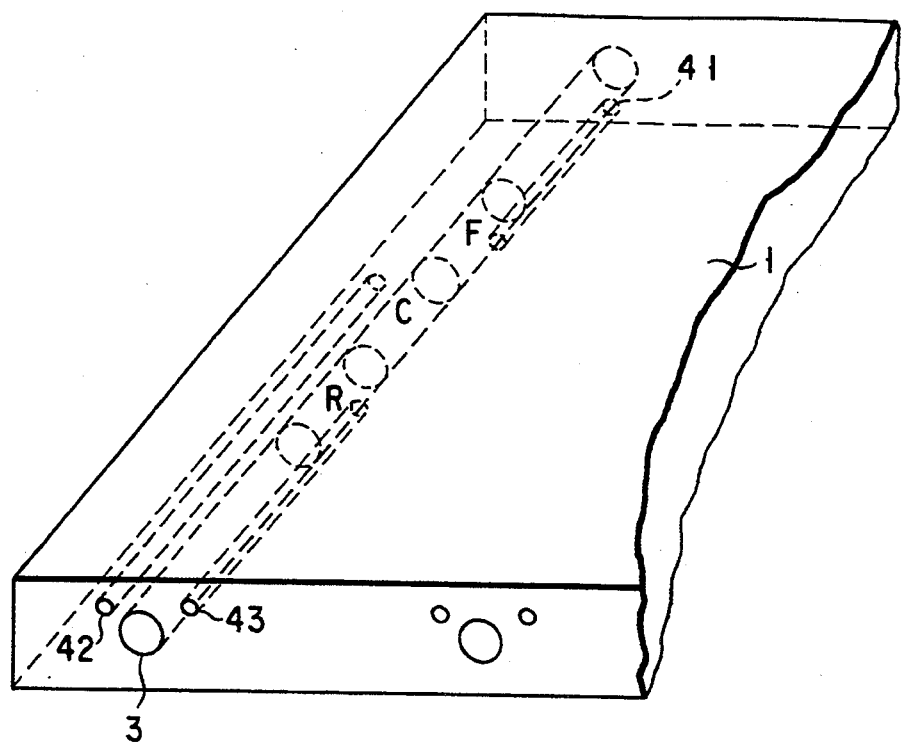
FIG. 5C is a view generally showing a heating plate of a semiconductor resin sealing apparatus according to the present invention.

FIG. 5C shows a variant of the present invention.

Three sensor insertion holes 41 to 43 are provided near one heater insertion hole 3 and are equal in number to the heating areas (F, C, R) of a heater inserted into the heater insertion hole 3.

The sensor insertion hole 41 reaches the middle of the heating area F of the front end portion of the heater. A sensor $4a$ inserted into the sensor insertion hole 41 detects temperature in the neighborhood of the heating area F of the front end portion of the heater. The sensor insertion hole 42 reaches the middle of the heating area C of the middle portion of the heater. A sensor $4b$ inserted into the hole 42 detects temperature in the neighborhood of the heating area C of the middle of the heater. The insertion hole 43 reaches the middle of the heating area R of the rear portion of the heater. The sensor $4c$ inserted into the hole 43 detects temperature in the neighborhood of the heating area R of the rear end portion of the heater.

Figure 6A:
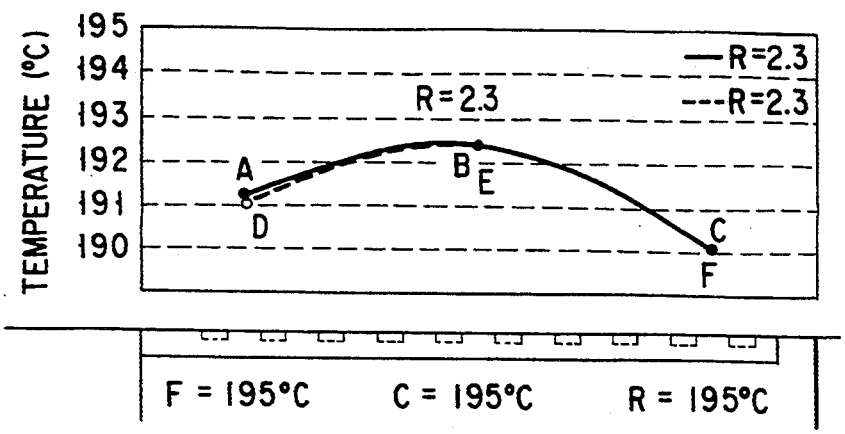
FIG. 6A is a view showing a relation of a heater temperature to a mold surface temperature in the heater arrangement of a mold of the present invention.
Figure 6B:
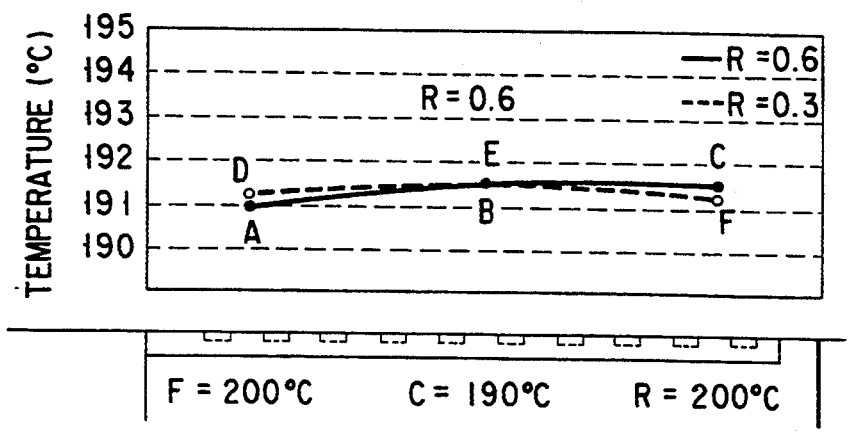
FIG. 6B is a view showing a relation of a heater temperature to a mold surface temperature in the heater arrangement of the mold of the present invention.
Figure 7:
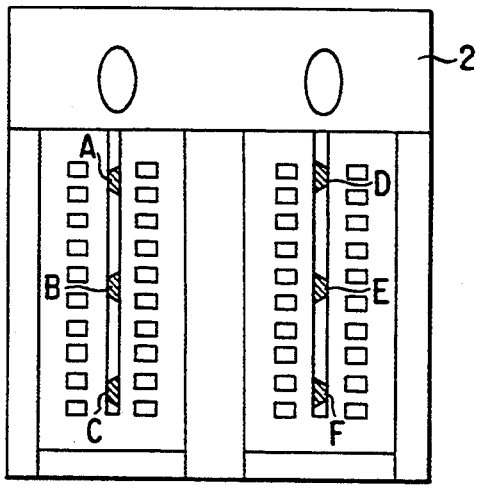
FIG. 7 is a view showing temperature measuring points in the relation of FIGS. 6A and 6B.

FIGS. 6A and 6B illustrate experimental data showing a relation of the temperature distribution of the chase to the heat generation characteristic of the heater in the mold of the present invention. FIG. 7 shows temperature measuring points.

FIG. 6A shows the case where the heat generation areas F, C and R of the heater are set to the same temperature level (195° C.). For the measuring points above, the variation range R of the temperature distribution is 2.3° C.

FIG. 6B shows the case where the temperature generation areas F, C and R of the heater are controlled to be set to predetermined temperature levels, that is, F=R=200° C. and C=190° C. The variation range R of the temperature distribution is 0.6° C. for the measuring points A to C and 0.3° C. for the measuring points D to F.

Figure 8:
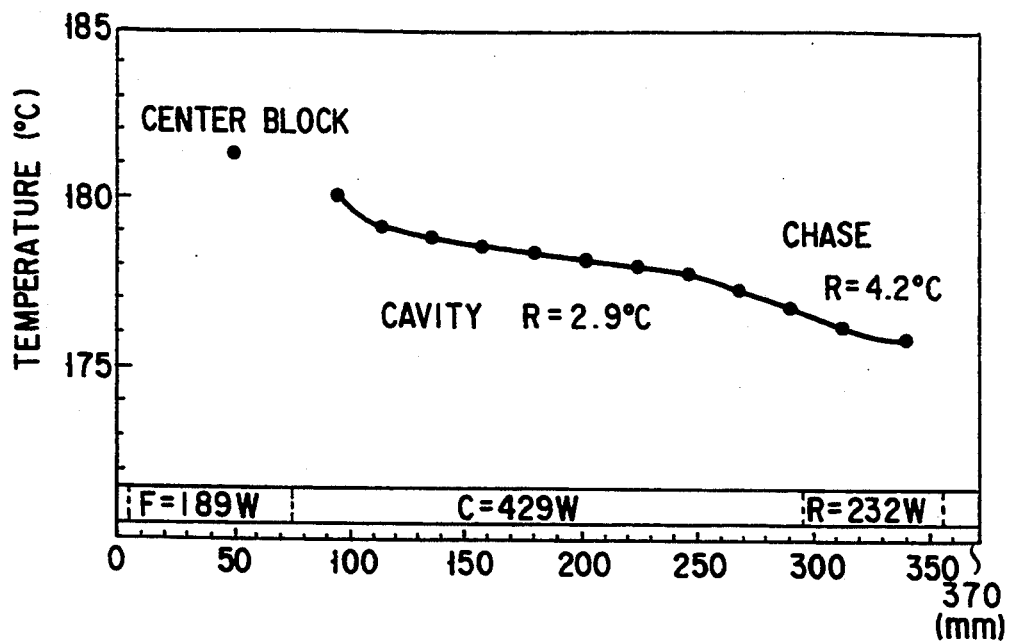
FIG. 8 is a view showing temperature distribution on a mold surface in the heater arrangement of the mold of the present invention.
Figure 9:
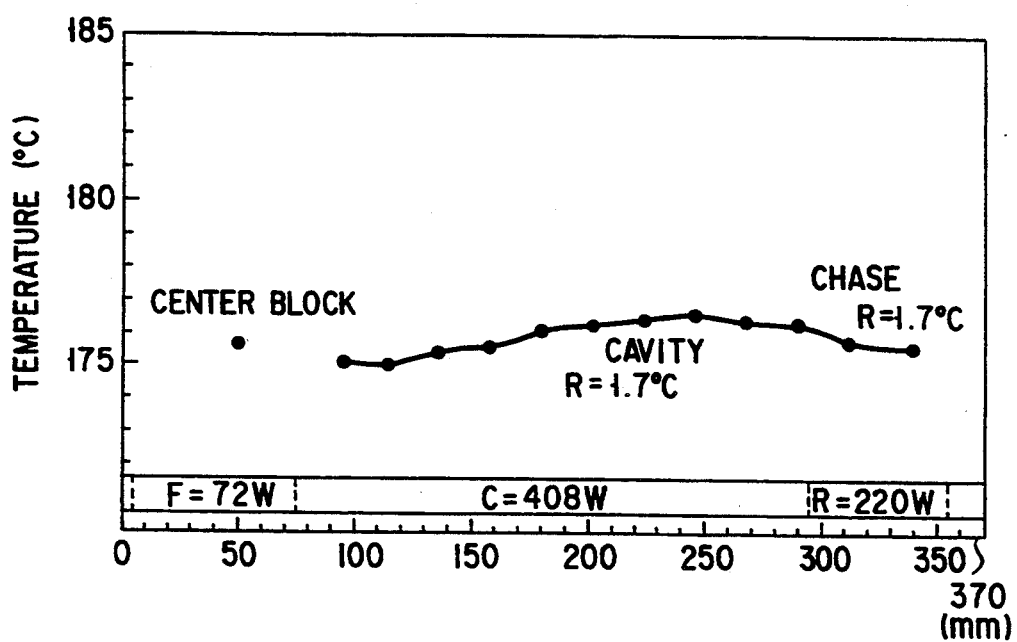
FIG. 9 is a view similar to that of FIG. 8.
Figure 10A:
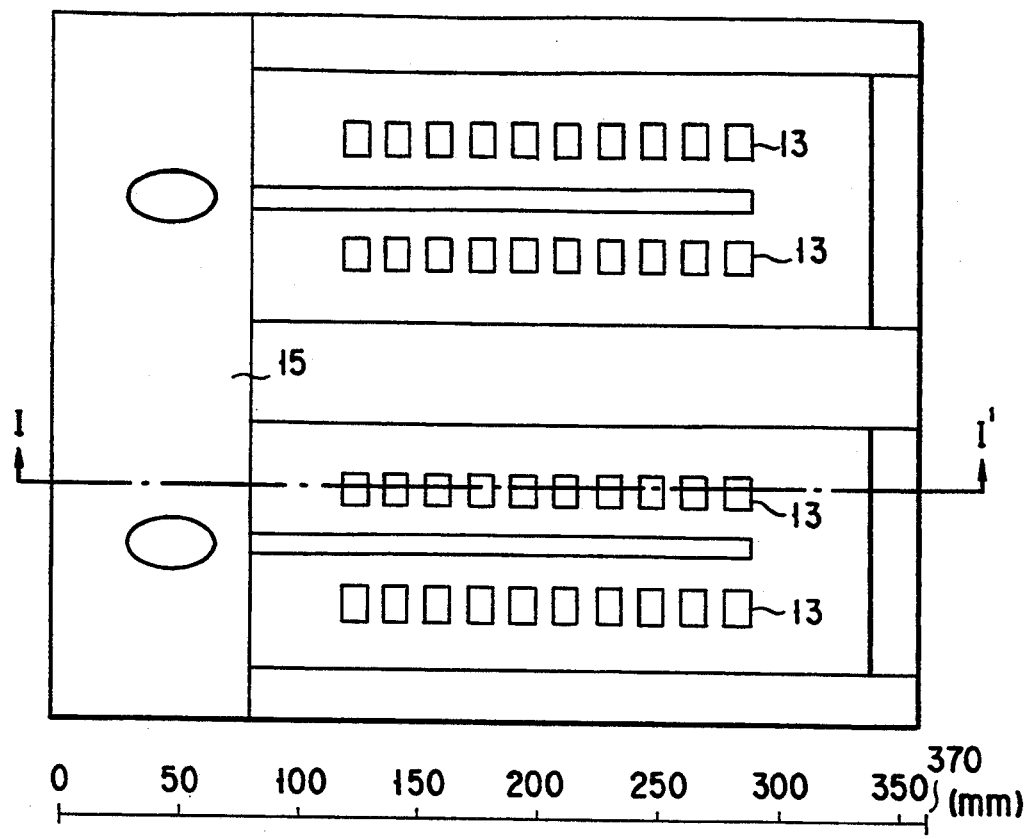
FIG. 10A is a view diagrammatically showing a semiconductor resin sealing apparatus according to the present invention.
Figure 10B:
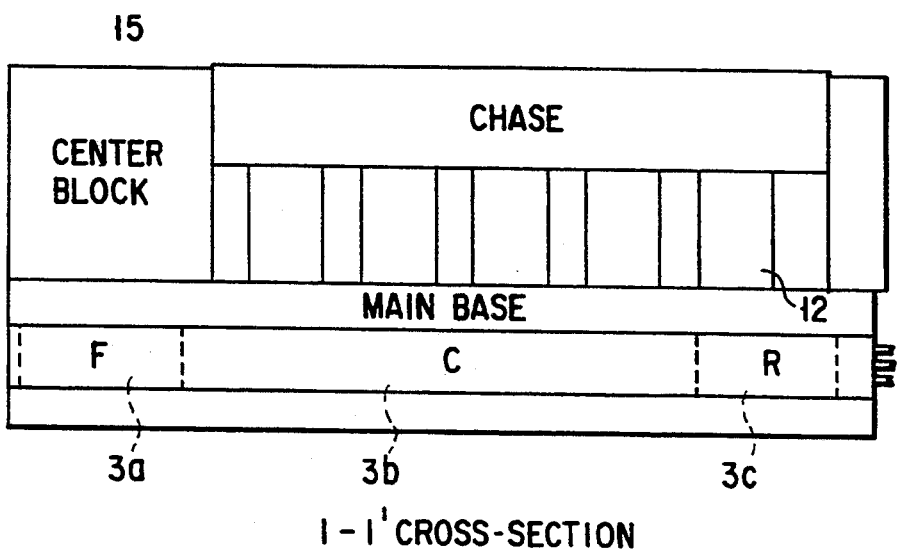
FIG. 10B is a cross-sectional view, taken along line I-I' in FIG. 10A, showing a temperature distribution on the mold surface in the heater structure of the mold of the present invention.

FIGS. 8 and 9 illustrate experimental data, in more detail, showing a relation of the temperature distribution of the chase to the heat generation characteristic of the heater in the mold of the present invention. FIGS. 10A and 10B show measuring points for the temperature distribution of the surface of the transfer mold where the measuring points are on the surface of the cavities 13 and center block 15 on a I-I' line in FIG. 10A.

For example, the sensor 4a, 4b, 4c are independently arranged on the heat generation areas F, C and R of the rod-like heater. The control section 5 controls the quantities of heat from the heat generation elements 3a, 3b, 3c so that the temperature detected at the sensors 4a, 4b, 4c becomes about 185° C. At this time, the outputs of the heat generation elements 3a, 3b, 3c are, for example, F=189W, C=429W and R=232W.

As a result, as shown in FIG. 8, the surface temperature variation range (maximum-to-minimum range) of the cavities 13 is 2.9° C. and the surface temperature variation range R of the chase 2 is 4.2° C. That is, the surface temperature variation ranges of the cavities 13 and chase 2 are relatively large. In order to reduce the surface temperature variation ranges of the cavities 13 and chase 2, the control section 5 controls the outputs of the heat generation elements 3a, 3b, 3c.

Then as shown in FIG. 9 the temperature detected by the sensors 4a, 4b, 4c is varied to a predetermined level. At this time, the outputs of the heat generation elements 3a, 3b, 3c become, for example, F=72W, C=408W and R=220W. As a result, the surface temperature variation range R of the cavities 13 is 1.7° C. and the surface temperature variation range R of the chase 2 is 1.7° C.

By controlling the outputs of the heat generation elements 3a, 3b, 3c it is possible to reduce the temperature distribution variation ranges of the cavities 13 and chase 2 in particular.

According to the present invention, one heater has the three heat generation areas at its front end portion F, middle portion C and rear end portion R in the axial direction of the heater, that is, along the insertion direction of the heater. By adjusting the outputs of the respective heat generation areas it is possible to properly set the temperature distribution of the product to be heated. According to the present invention the uniform temperature distribution of the heating plate can be obtained, for example, as shown in FIGS. 6B and 9, without changing the heater by itself, simply by adjusting the temperature levels of the front end portion F, middle portion C and rear end portion R by means of the temperature adjusting devices 6a, 6b, 6c.

In the aforementioned embodiment, one heater has three heat generation areas F, C and R but the present invention can achieve its object even if two or more heat generation areas are provided even though three are shown. Further, the temperature adjusting devices correspond in number to the heat generation elements, but a single temperature adjusting device serves the same purpose. It is preferred that the sensors correspond in number to the heat generation areas.

As explained above, one heater has a plurality of heat generation areas, for example, three heat generation areas at the center and right and left end portions. It is, therefore, possible to adjust the temperatures of these heat generation areas and hence to properly set the temperature distribution of the products to be heated. According to the present invention it is possible to readily obtain the uniform temperature distribution of the heating plate if the heater temperature at the center and right and left portions as set forth above is adjusted by means of the temperature adjusting devices without changing the heater itself. It is not necessary to repeat trial-and-error actions encountered in the prior art so as to determine the characteristic of the heater.

The resin sealing apparatus of the present invention, having the plurality heat generation areas in one heater, can save a mount space for the heater at the heating plate in comparison with the conventional resin sealing apparatus where one and only one heat generation area is provided in one heater. Thus the resin sealing apparatus of the present invention obviates the need to provide any external heater for compensating for heat generation, ensures a simpler arrangement for the heater and achieves a space saving.

Further the resin sealing apparatus of the present invention can achieve the easiness with which the heater is inserted and withdrawn. With the resin sealing apparatus of the present invention a plurality of heat generation areas are provided for one heater and, even if a plurality of heaters are used, it is possible to prevent any non-heated area from being created between the heaters and to contribute much to uniform temperature distribution in the heating plate.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A semiconductor resin sealing apparatus comprising:
   a plurality of rod-like heaters having a plurality of heat generation areas arranged from a front end toward a rear end;
   a die set having a heating plate, the heating plate having a first side, a second side, a plurality of heater insertion holes extending through the heating plate from the first side toward the second side and a plurality of sensor insertion holes adjacent each heater insertion hole, each of the rod-like heaters being inserted into a corresponding heater insertion hole, the number of sensor insertion holes adjacent to each corresponding heater insertion hole being equal to the number of heat generation areas of the rod-like heater inserted within the corresponding heater insertion hole, each of the sensor insertion holes having a first end with an inlet and a second end located in a position corresponding to a predetermined heat generation area of the rod-like heater, the inlet of at least one of the sensor insertion holes being located on the first side of the heating plate, the inlets of the remaining sensor insertion holes other than the at least one sensor insertion hole being located on the second side of the heating plate;
   a chase arranged on the heating plate, the chase having cavities with semiconductor devices placed therein and a runner providing a passage for molten resin;
   a plurality of sensors each inserted into a corresponding sensor insertion hole, each sensor detecting temperature at a respective heat generation area of a rod-like heater to provide a paired unit with the respective heat generation area; and
   a control section for independently setting the temperature at the respective heat generation areas of the rod-like heater to a predetermined level based on the temperature at the respective heat generation areas.

2. The semiconductor resin sealing apparatus according to claim 1, wherein the apparatus has four heater insertion holes, four or more sensor insertion holes, four rod-like heaters and four or more sensors.

3. The semiconductor resin sealing apparatus according to claim 1, wherein a heat generation element is arranged at the respective heat generation areas of the rod-like heater and the control section controls a quantity of heat from the heat generation element on the basis of the temperature at the respective heat generation areas of the rod-like heater.

4. A semiconductor resin sealing apparatus comprising:

- a plurality of rod-like heaters each having a plurality of heat generation areas arranged from a front end toward a rear end;
- a die set having a heating plate, the heating plate having a first side, a second side, a plurality of heater insertion holes extending through the heating plate from the first side to the second side and a plurality of sensor insertion holes adjacent each heater insertion hole, each of the rod-like heaters being inserted into a corresponding heater insertion hole, the number of sensor insertion holes adjacent to each corresponding heater insertion hole being equal to the number of heat generation areas of the rod-like heater inserted within the corresponding heater insertion hole, each of the sensor insertion holes having a first end with an inlet and a second end located in a position corresponding to a predetermined heat generation area of the rod-like heater, the inlet of at least one of the sensor insertion holes being located on the first side of the heating plate, the inlets of the remaining sensor insertion holes other than the at least one sensor insertion hole being located on the second side of the heating plate;
- a chase arranged on the heating plate, the chase having cavities with semiconductor devices placed therein and a runner providing a passage for molten resin;
- a plurality of sensors each inserted into a corresponding sensor insertion hole and corresponding in number to the plurality of heat generation areas of the rod-like heaters, each sensor detecting temperature at a respective heat generation area of a rod-like heater to provide a paired unit with the respective heat generation area; and
- a control section for independently setting the temperature at the respective heat generation areas of the rod-like heater to a predetermined level based on the temperature at the respective heat generation areas.

* * * * *